United States Patent [19]

Casper

[11] Patent Number: 4,692,893
[45] Date of Patent: Sep. 8, 1987

[54] BUFFER SYSTEM USING PARITY CHECKING OF ADDRESS COUNTER BIT FOR DETECTION OF READ/WRITE FAILURES

[75] Inventor: Daniel F. Casper, Poughkeepsie, N.Y.

[73] Assignee: International Business Machines Corp., Armonk, N.Y.

[21] Appl. No.: 685,514

[22] Filed: Dec. 24, 1984

[51] Int. Cl.⁴ ............................................. G06F 11/10
[52] U.S. Cl. .................................... 364/900; 371/49; 371/50; 371/51
[58] Field of Search ........................... 371/49, 50, 51; 364/200 MS File, 900 MS File

[56] References Cited

U.S. PATENT DOCUMENTS

| | | | |
|---|---|---|---|
| 3,836,891 | 9/1974 | McDaniel | 364/900 |
| 4,092,522 | 5/1978 | Miller | 371/49 |
| 4,271,521 | 6/1981 | Mahmood | 371/51 |
| 4,360,917 | 11/1982 | Sindelar et al. | 371/51 |
| 4,365,332 | 12/1982 | Rice | 371/50 |

OTHER PUBLICATIONS

"Buffer Memory with Detection of Data Errors and Errors Caused by Faults in the Read and Write Address Registers" by D. M. Duffy, W. R. Lockwood and T. K. Zimmerman, Research Disclosure, Jan. 1986, No. 261, A-132, Kenneth Mason Publications Ltd, England.

Primary Examiner—Archie E. Williams, Jr.
Assistant Examiner—Emily Yue Chan
Attorney, Agent, or Firm—W. S. Robertson

[57] ABSTRACT

A data buffer has a storage array that is addressable for read and write operations by an address of n bits that are supplied by a read address counter and a write address counter that each have n+1 bits. The n+1th bit is in effect a counter for passes through the array by the read and write circuits. During a write operation the n+1th bit of the write counter is stored as part of a parity bit for the addressed array location. During a read operation the n+1th bit of the read address counter is entered into a parity checking function on the word read from the addressed location. An errror is signaled if the n+1th bit of the read address counter does not agree with the n+1th bit of the write counter at the time of the write operation. For example, an error is detected if the write circuits fail and the read circuits make a second pass through words that have previously been read. The same entries on a next pass through the array.

6 Claims, 2 Drawing Figures

BUFFER SYSTEM USING PARITY CHECKING OF ADDRESS COUNTER BIT FOR DETECTION OF READ/WRITE FAILURES

FIELD OF THE INVENTION

This invention relates to data processing and more specifically to a buffer system with means for detecting errors caused by failures in the read and/or write circuits.

INTRODUCTION

Queues

A queue that is implemented in a buffer memory is well known, but it will be helpful to review the features and terminology that particularly apply to this invention. It will usually be helpful to distinguish between terms that identify data units and terms for the associated units of hardware, but it is not always necessary to make this distinction and some of the terminology can be used in a general way.

In a data processing system, a "list" is a sequence of data items or entries, for example a list of patent numbers. The ends of the sequence are called the "top" and the "bottom" or the "front" and the "back". The entries in a list can be accessed in some arbitrary order for adding or removing items, and a separate terminology exists for special accessing procedures. When entries are entered at the back of the list and are removed from the front of the list, the list is called a "queue" by analogy to a queue of riders waiting at a bus stop. A queue can also be called a first-in-first-out list.

A queue commonly holds a sequence of data items that are being transferred from a sending component to a receiving component. Data items are entered into the queue by the sender and are removed from the queue by the receiver. The first-in-first-out organization of the queue preserves the original sequence in which the items were transmitted from the sender to the receiver. The term "buffer" describes this function, and a queue that is used for this purpose is commonly called a buffer.

Data Buffers

A queue, which has been described so far as a data construct, can be implemented as a block of sequential storage locations in a physical storage device, one storage location for each entry. The storage device that implements a buffer or a queue is called a buffer store or a buffer memory, or the term buffer can be used to express both the data aspect and the hardware aspect. A buffer can be part of a larger memory or it can be implemented in an independent memory that is used only to implement the queue.

A storage location in the buffer can be accessed for read or write operation by means of an address. An address can be treated as a number, and addresses for accessing each storage location in sequence can be formed by incrementing or decrementing a counter. For an introductory example, the front of the queue can be assigned arbitrarily to the high address storage location. Since the length of the queue varies as items are entered and removed, a queue or buffer management system has a counter that keeps track of the address of the back of the queue. This address is commonly called the back pointer or, to emphasize the memory hardware aspects, the write pointer.

As a specific example, suppose that storage locations 0 to 127 have been allocated to the queue and that storage location 127 holds the front of the queue. If the queue is full, the back pointer points to storage location 0 and if it is empty it points to location 127. When an item is added to the storage location of the back pointer, the back pointer is decremented to the next storage location. In this example, when an item is removed from the front of the queue, all remaining items in the queue would be shifted forward one storage location, like riders at the bus stop, and the back pointer would be incremented.

More commonly, the data entries do not shift forward when an item is removed, but instead the queue management system has a counter that that is analogous to the back pointer that has been described already. The count value of this counter is called the front pointer or the read pointer. When an item is removed from the storage location identified by the front pointer, the front pointer is decremented to point to the storage location of the next item at the new front of the queue. Similarly in this implementation, the back counter is decremented when an item is added to the queue and it is not changed when an item is removed.

The queue is often circular: when the back pointer has been decremented to storage location 0 in the example, it next wraps around to storage location 127. The front pointer is similarly decremented. A seven bit address counter wraps around in a way that provides this sequence. Decimal 127 is binary 0111 1111 (the binary digits are grouped in fours to make them easier to read), and decimal 128 is 1000 0000. Such a counter is called a modulo 127 counter. The same effect is achieved by reading only the seven low order bit positions of a longer counter.

Note that the pointers are decremented (instead of incremented) only because the queue in the example has been formed with the front arbitrarily, at the high address and the back at the low address. From a more general standpoint, a pointer is "advanced" in whichever direction is implemented. For generality, the direction will be from front to back around the circle, with a reference to the wrap around operation only were a reminder is appropriate. The general case will be readily apparent where specific examples are used.

The buffer management system handles the pointers for proper data entry. Unless the queue is empty (as discussed later), the front pointer points to a valid entry at the front of the queue. The back pointer points to the first empty storage location, which is one location beyond the last valid entry. As entries are removed from the queue, the front pointer is advanced (the front pointer counter is incremented or decremented) through a sequence of previously filled storage locations. As new entries are made at the back of the queue, the back pointer is advanced through previously emptied storage locations.

When the back pointer has been advanced to the front pointer, the queue is full and no more items can be entered. The queue is made large enough to handle data at the maximum rate of the sender to prevent the queue from overflowing, or some appropriate action is be taken to reduce the data rate of the sender to the rate of the buffer. When the front pointer reaches the back pointer, the queue has become empty, and this condition may signal the entry removing circuits to stop. This condition occurs normally after the sending component has sent the last entry or when the sending component has momentarily stopped or slowed.

Note that a particular pointer management system may advance a pointer before a read or write operation or after the operation, and this choice will affect the relative positions of the read and write pointers in the examples. This effect is well known, and the general case will be understood from the specific examples.

This invention will preferably be embodied in a hardware buffer that handles only the queue, and it will be helpful to introduce the terminology of these buffers. The unit of data in a storage location is commonly called a "memory word" or a "word" and a storage location for a word can be called a word location. The operation of entering a word into the buffer is called store or write and the operation of removing a word from the buffer is called fetch or read.

Error Detection in Buffer Memories

When an error has occurred in a memory word, a bit that had a 0 or 1 value when the word was stored has been changed to the opposite value when the word is read from the memory. A parity checking circuit in effect counts the number of 1 bits in a word and adds a 1 or 0 parity bit to make the count odd or even, whichever is selected for the error detection system. Adding a 1 bit changes the parity from odd to even or from even to odd, and adding a 0 bit leaves the parity unchanged. From a logic circuit standpoint, the parity function is the Exclusive OR function of the data word, and parity check circuits are usually implemented as a tree of binary Exclusive OR circuits. If the parity circuit adds a bit that gives each word odd parity before the word is stored in the memory, the circuit is called an odd parity circuit. In a system with odd parity, all valid words have odd parity and all words with even parity are invalid. Thus, a single error either increases or decreases the number of 1 bits and thereby changes the parity of the word. If two errors occur in the same word, the word keeps its original parity, and the error is undetectable.

It is conventional to provide a parity bit position in each storage location. The read circuits that store a memory word calculate the parity bit and store it as part of the memory word. The write circuits that fetch the memory word similarly calculate the parity of the word and signal an error if it has the wrong parity.

It is also known to form a parity bit as a function of both the data and the address. During a write operation, the check bits are formed on the data word and the address in the same way that has been described already for forming the check bits on the data word alone. During a read operation, the checking circuits similarly operate on both the memory address and the word read from the addressed location.

The fact that the parity function is associative can be used to provide a simplified viewpoint for this description and for some of the later explanation. As the background has been presented so far, the parity of the address and the data would be formed by one large parity tree circuit. The parity of the data and the address can be formed conceptually by first forming the parity of the data and the parity of the address and then forming the parity of these two parity bits. The circuit can be implemented as a first parity generator for the address, a second parity generator for the data and a third parity generator for the two previously formed parity bits. Thus, it is formally correct to consider the parity of the address and the parity of the data separately, and this viewpoint will simplify some of the examples.

To illustrate a failure in the addressing circuits, the data word and address for the write operation can be designated word1 and address1, and the check bits formed on word1 and address1 can be designated check 1. In the same notation, check2 is formed from word2 and address2 during the read operation. The failure of the addressing circuit causes address1 and address2 to differ and ordinarily causes word1 and word2 to differ. This error may be detectable as a parity error.

If more parity bits are provided for each memory word, more complex errors can be detected and/or corrected. The preferred embodiment of the invention will use a one bit parity check, and the examples will be simplified by describing the preferred system. The explanation can be extended readily to more complex codes, and for generality the terms parity circuits and parity bits will be used where each memory word (and preferably each word location) has one or more parity bits.

OBJECTS OF THE INVENTION

One object of this invention is to improve the system that has been described by providing a method and apparatus for detecting an additional error condition.

It is possible for a component failure to allow the read operation to advance beyond the write operation and for the read pointer to enter storage locations that so far in this specification have been treated as being empty. In most buffer systems, these storage locations contain the data that was written during the previous pass through the buffer by the write circuits. If the entries were originally correct, they will not cause an error to be detected in these conventional systems.

As one example of such a failure, the write circuits may fail while the write pointer advances properly. When the read pointer catches up with the point of failure, the output of the buffer will be formally correct, but the input data will be lost. This error will probably be caught at some later stage of the operation and the program will be rerun or the data will be recovered in some other way.

A failure with similar results can occur if the read or write pointers fail and the read pointer advances beyond the write pointer.

THE PRIOR ART

The address pointers are conventionally checked as part of the operation already described to signal that the buffer is full or empty. The prior art has suggested a number of circuit redundancy techniques that may be applicable to the pointer checking circuits. Similarly, the read and write circuits can be made redundant. However, it is usually undesirable to make these circuits more complex.

It is possible to assign a validity bit to each storage location and to set the bit to valid after a write operation and to invalid after a read operation. Similarly, each storage location can be cleared after a read operation, or it can be written with an invalid bit combination. For example, a bit pattern with bad parity can be written into each storage location after it has been read. If the storage location is read again before valid data is entered by an intervening write operation, a parity error will be signaled. However, these additional write operations ordinarily slow the operation of the buffer.

SUMMARY OF THE INVENTION

This buffer system of this invention has an address of n bits that is conventionally formed by a modulo-$2^n$ counter in the way already described. Each storage location has a parity bit position, and the parity bit is an Exclusive Or function of the data and the address, or preferably the data alone, in a modification of the conventional apparatus that has been described. According to this invention, this address is formed from n bits of a modulo $2^{n+1}$ counter, and bit $n+1$, of the counter is entered into the parity function. In the notation, that will be used in this specification, the low order address bits of the counter will be numbered 1 through n, in contrast to the alternative numbering 0 through $n-1$.

To continue the example for a 7 bit address, the address part of each address counter advances from 000 0000 to 111 1111 on each pass through the buffer. The full eight bits advance from 0000 0000 to 0111 1111 on one pass through the buffer and from 1000 0000 to 1111 1111 on the next pass. Thus, the $n+1$th bit switches between 0 and 1 at the end of each pass through the memory. As has already been explained, the seven low order bits are unchanged by the fact that the eighth bit switches between 0 and 1 at the end of each pass. The $n+1$th bit acts as a 1 bit counter, and it will be convenient to call the read and write passes odd and even according to the value of the $n+1$th bit.

Suppose that the data word to be written is unchanged on two consecutive passes by the write circuits (or more simply that the parity of the data is unchanged). In the write circuits, the effect of switching bit $n+1$ of the write address counter is that the same data word is stored in the memory with odd parity on one pass and even parity on the next pass. Thus, in this example on one pass through the memory the parity bit would be a 1 and on the next pass it would be a 0.

In the read circuits, the $n+1$th bit of the read address counter is applied to the parity checking circuit so that the inputs to the read parity circuit are the same as the original inputs to the write parity circuit if there has been no error and if the addressing circuits have not failed. However, if the memory word is unchanged a parity error will be detected because bit $n+1$ has been changed at the input to the read parity generator.

A more general explanation will be readily understood after the preferred embodiment has been described.

DESCRIPTION OF THE PREFERRED EMBODIMENT(S)

Figure 1:
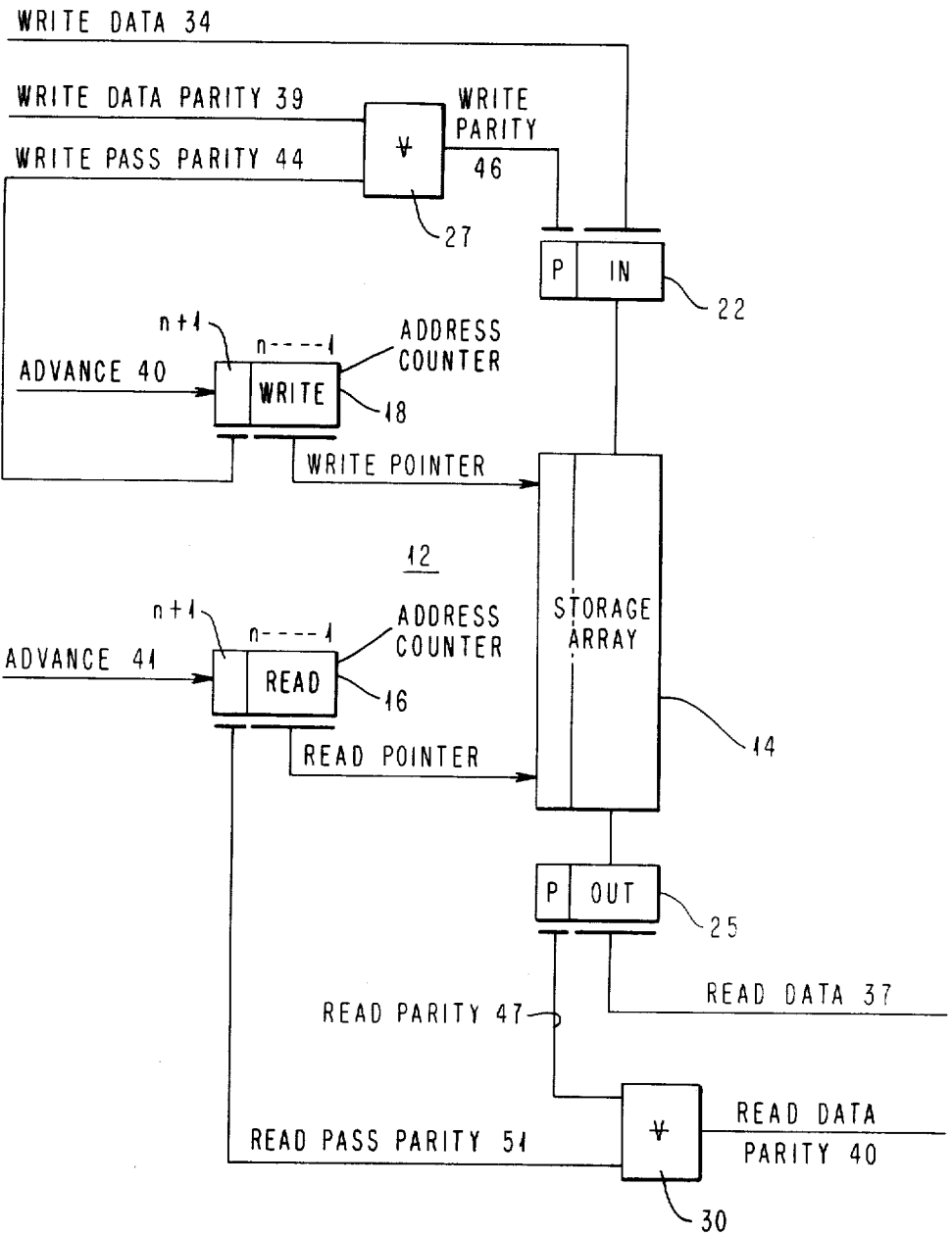
FIG. 1 is a block diagram of the buffer system of this invention.

Conventional Features—FIG. 1

A buffer memory system 12 has an array 14 of storage locations, a read address register 16 and a write address register 18, a register 22 for data to be written into an addressed location, a register 25 for data read from a storage location, an Exclusive Or tree 27 for forming a parity bit to be stored with the word in write register 22 and an Exclusive OR tree 30 for forming a parity bit that signals whether an error has been detected in the word read from the memory.

Data to be written enters the buffer system on a bus 34 that is connected to a sending component, and data to be read leaves the buffer on a bus 37 that is connected to a receiving component. In the preferred system, the buffer is connected between central processor memory and an auxiliary storage device such as a magnetic recording disk, and means is provided for switching busses 34 and 37 for transmitting data in either direction. Preferably buses 34 and 37 are each as wide as the disk storage device. Other components change between the format of bus 34 or 37 and the wider bus of main memory.

Data from the sender 34 preferably has a parity bit Write Data Parity on a line 39. Circuits that are not shown in the FIG. 1 check bus 34 and line 39 for correct parity. Similarly, a line 40 carries a parity bit Read Data Parity for the data on bus 37.

Address counters 16 and 18 receive signals on lines 40 and 41 that advance the counters (increment or decrement) at a suitable point in each memory access cycle. Conventional means is provided to signal that the buffer is full or empty or not empty, and conventional means is provided to prevent the read counter from advancing past the write pointer.

As the drawing has been described so far, the components and their interconnections are conventional and are well known in various specific forms.

The Write and Read Addressing Circuits—FIG. 1

The low order bits of write counter 18 form a conventional modulo-$2^n$ counter for addressing the array. The preferred buffer has 127 addressable locations, and counter 18 holds 7 address bits that are numbered 1 through n. The $n+1$th bit is not used in addressing but forms a signal Write Pass Parity on a line 44 which is an input to Exclusive Of circuit 27. Circuit 27 produces a signal Write Parity on a line 46 which is entered into the conventional parity position of Write Data register 22.

The read address circuits are similar to the write address circuits. The low order n bits of counter 16 form the address for the word at the front of the queue. Exclusive Or circuit 30 receives the conventional bit Read Parity on a line 47 from the parity position of the memory data out register 25, and it receives the bit Read Pass Parity from the $n+1$th position of counter 16 on a line 51. Exclusive Or circuit 30 produces the signal Read Data Parity on a line 40. Bus 37 and parity line 40 are handled conventionally by circuits that receive the data and parity bit except that an addressing circuit fault in buffer system 12 will cause a parity check, as will be explained later in the description of FIG. 2.

Figure 2:
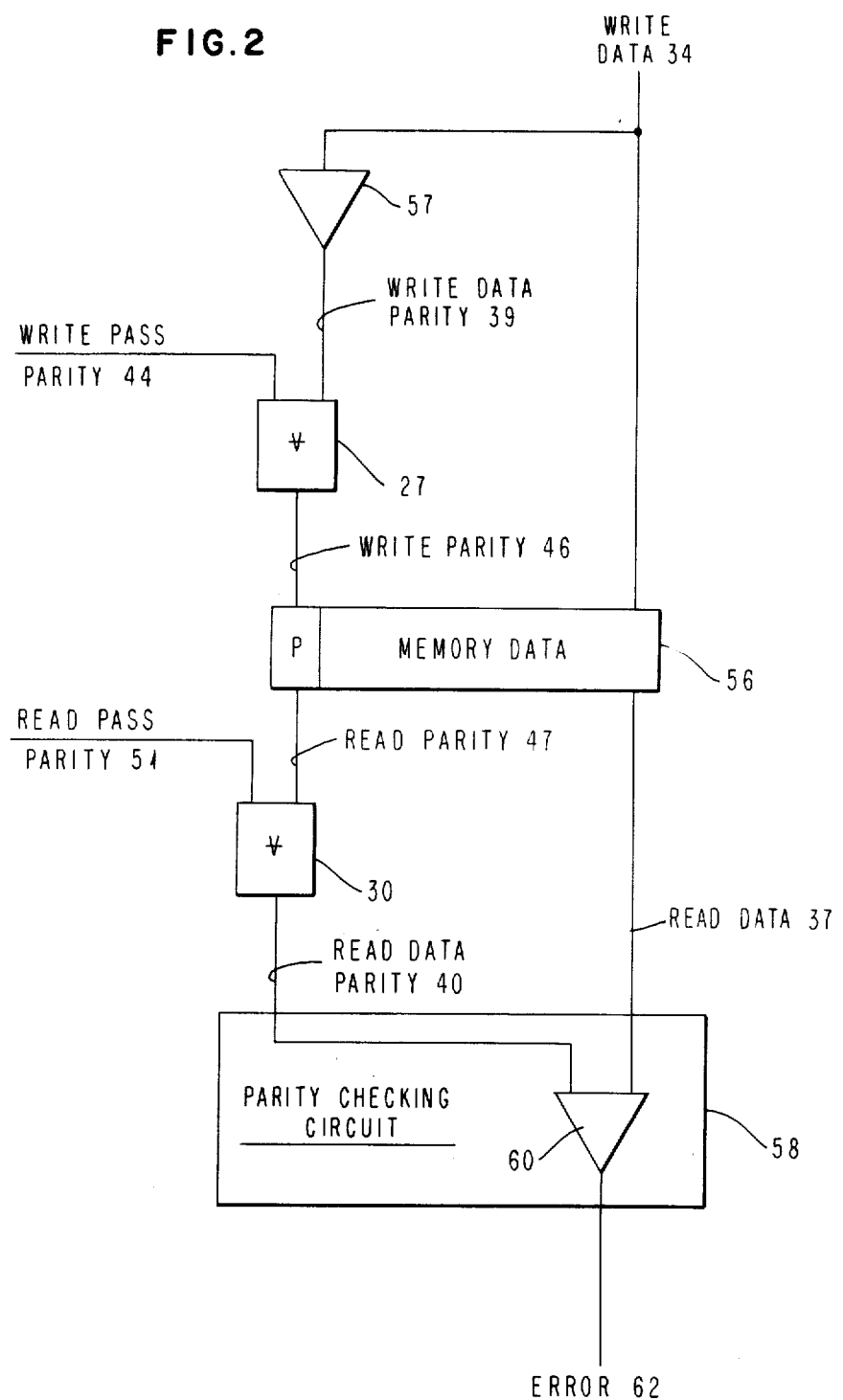
FIG. 2 shows a sequence of parity generating and checking operations in the buffer system.

Operation—FIG. 2

In FIG. 2, the buses Write Data 34 and Read Data 37 will be familiar from FIG. 1. Block 56 represents one location in memory, array 14 for storing the data word and parity bit for this example. The signals Write Pass Parity on line 44 and Read Pass Parity on line 51 are generated by the counters shown in FIG. 1 and are combined with signals Write Data Parity and Read Parity in Exclusive Or circuits 27 and 30 respectively, as in FIG. 1.

FIG. 2 additionally shows a parity tree circuit 57 that operates on the data on bus Write Data to form the Write Data Parity bit on line 39, and it shows a conentional parity checking circuit 58 that is connected to bus 37 and parity bit line 40 at the output of the memory. The parity checking circuit has an Exclusive Or tree 60 that forms the parity of Read Data on buss 37 and Read Data Parity on line 40. An example later will show that an addressing circuit fault causes parity checker 58 to raise a signal Error on line 62. Components 57 and 58 are a conventional part of the data processing apparatus using the buffer system of this invention.

It will be helpful to review first the conventional data checking function illustrated by FIG. 2. In conventional apparatus without Write Pass Parity and Read Pass Parity and without Exclusive Or circuits 27 and 30, Write Parity is the same as Write Data Parity and Read Data Parity is the same as Read Data Parity. An error is signaled if Read Data differs detectably from Write Data. If no data error has occurred, Write Data, Memory Data, and Read Data are all identical and therefore have the same parity. The parity of Write Data on line 39 is stored in the parity bit position P of memory location 56. Exclusive Or tree 60 in effect forms the parity of the eight bits of Read Data on line 37 and compares it with the parity bit on line 40 from memory location 56. An error is signaled if the parity of Read Data differs from the parity of Write Data or if the parity bit in memory location 56 is not the correct parity of Write Data.

When the addressing circuits operate without error, Write Pass Parity on line 44 equals Read Pass Parity on line 51. On even passes, Write Pass Parity and Read Pass parity are each 0. Since a 0 bit has no effect at the input of an Exclusive Or circuit, Write Parity on line 46 equals Write Data Parity on line 39 and Read Parity on line 47 equals Read Data Parity on line 40. Thus, this example is the same as the earlier example of conventional data error checking. Similarly, on odd passes Write Pass Parity and Read Pass parity both equal 1. Exclusive Or circuit 27 inverts the Write Data Parity bit and Exclusive Or circuit inverts the Read Data Bit. These two changes preserve the original parity and no error is detected in parity check circuit 58.

Conversely, if Write Pass Parity and Read Pass Parity are not equal, one of the Exclusive Or circuits 27 or 30 inverts its other input (Write Data Parity or Read Data Parity) and the other Exclusive Or circuit transmits the other input unchanged. Thus, there is a single change in a bit in the data path, and a parity error will be detected in parity checker 58.

As the data transfer operation has been described so far, the write pointer would remain at the position of the last word written into the array and the read pointer would advance to this position as the remaining words are read from the array. After the last word has been read, the read and write pointers would be ready to begin a next data transfer, starting at the next storage location in the array.

Some data transfers are handled differently. When an I/O device is the sending unit and processor memory is the receiving unit, the I/O device may send more data than the processor needs. In this situation all of the data from the sender is written into the array, but the the read operation is stopped before the all of the data has been read. This unread data is in effect discarded. The pointers are reset in either of two ways, by setting both pointers to a fixed starting position or by setting the read pointer to equal the write pointer.

In this buffer system the pointers are reset by the conventional operation of setting the read pointer to the value of the write pointer. This operation has a significant effect when the buffer handles a short data transfer operation. If the pointers are reset to a fixed position to begin each data transfer, the n+1th bit of each counter will always be 0 (or always 1) at the beginning of a data transfer. If a short data transfer does not fill the buffer, the n+1th bit of the address counters will not be changed and the next operation will begin with the counters reset to the fixed value. In this case, an error that occurs when the buffer is not filled will not be detected on the next pass through the buffer. If several short data transfers occur in succession, an error may go undetected for a significant time. By contrast, setting the read pointer to the value of the write pointer causes the n+1th bits to change with each pass through the array without regard to the length of the data transfer. As is conventional, the pointers are reset when power is first supplied to the buffer system or on a conventional reset of the buffer system.

OTHER EMBODIMENTS

Ordinarily, a single parity bit will be stored in memory as has been described. If a failure causes multiple errors which are undetectable at some storage locations in array 14, a detectable error will very probably occur in one of the $2^n$ locations. A specific object of the invention is to detect the failure when it occurs, but a more general object is to detect that an error has occurred at some point during the data transfer where some recovervaction can be taken conveniently, for example retransmitting the data through a different path having a similar buffer.

In a later development, Duffy, Lockwood and Zimmerman (Research Disclosure 26134, January 1986) have proposed independently forming and separately storing Write Pass Parity bit 44 and Write Data Parity bit 39. Their buffer system does not have Exclusive Or circuits 27 or 30. The Write Data Parity bit in a memory word 56 is conventionally applied to Read Data Parity line 40 and it is handled conventionally by components that are connected to receive data on this bus. If a parity error is detected on this bus, it signifies a conventional data error and not an addressing error. On a read operation, the Read Pass Parity bit on line 51 is compared with the previously stored Write Pass Parity bit. A mismatch signifies an addressing error.

The buffer is two bytes wide and is implemented as two arrays with separate addressing circuits. A data parity bit position is provided for each byte, as is conventional. In addition, a Write Pass Parity bit position is provided for each data byte, and the Write Pass Parity bit 44 is stored in each array. On a read operation, a three way comparison is made of the two Write Pass Parity bits and the Read Pass Parity bit.

Bit position n+1 of address counters 16 and 18 is used in a somewhat different way to form the Write Pass Parity bit and the Read Pass Parity bit. One Exclusive OR circuit is connected between the n+1th bit position of the write address counter and another Exclusive OR circuit is connected between the n+1th bit position of the read address counter and the compare circuit. A latch output forms a second input to each Exclusive OR circuit so that the n+1th bit is inverted when the latch is set and is not inverted when the latch is reset. The latch is set and reset from the external source that supplies data to the buffer system. Ordinarily the buffer is not filled during a data transfer, and the pointers are reset and the latch is flipped to provide a different parity for the next data transfer.

From the description of the preferred embodiment of the invention and several modifications of this embodi-

What is claimed is:

1. A buffer memory system for transmitting a succession of data words between components of a data processing system, comprising,
 a buffer memory having $2^n$ word storage locations addressable by an address of n bits,
 means for accessing the buffer memory as a circular queue, said accessing means including a modulo n write address counter, means for forming an intermediate code signifying the parity of a data word to be stored, means for storing a data word and a parity code at the buffer memory location addressed by the write address counter, and means for advancing the write address counter for successive write operations, a modulo n read address counter, means for reading a data word from the location addressed by the read address counter and means for advancing the read address counter, and means for checking parity of a data word read from the buffer memory and signaling an error or the absence of an error,
 wherein the improvement comprises,
 means connected to the write address counter for identifying alternate passes through the write address counter and the corresponding passes through the buffer memory as odd and even, and means for forming said parity code stored at a buffer location as a predetermined parity function (odd or even) of said intermediate code on an odd write pass and the opposite parity on an even write pass,
 means connected to the read address counter for identifying said alternate odd and even passes through the buffer memory and cooperating with said data word parity checking means to check a word read from the buffer memory during an odd read pass for said predetermined parity and during an even read pass for the opposite parity,
 whereby a parity error is signaled by said means for checking parity in case the read operation does not proceed in the same parity sequence as the write operation.

2. In a buffer system for storing data words temporarily during a data transfer from a sender to a receiver, said buffer system having
 an array of word storage locations,
 write circuits including a write address counter and means for advancing said counter in a predetermined circular sequence of word storage location addresses for writing data words from the sender into the corresponding sequence of word storage locations,
 read circuits including a read address counter and means for advancing said read address counter in said sequence for reading data from said storage locations in said sequence,
 a cycle of one of said address counters corresponding to a pass through the array by the read circuits or the write circuits,
 an improvement for detecting errors caused by faults in said read or write circuits, comprising,
 additional bit position means in said write counter for counting passes through the array by said write circuits and additional bit position means in said read counter for counting passes through the array by said read circuits,
 means for setting the value of the read pass count equal to the value of the write pass count at the begginningg of a data transf er,
 bit position means in each storage location of the array and means for entering a function of the write pass count into said bit position means of a storage location addressed for a write operation, and
 means for comparing the pass count of the read address counter with the write pass count read from the array and for signaling an error if said counts do not compare equal.

3. The buffer system of claim 2
 wherein said additional bit position means in each of said counters comprises one bit position,
 and wherein said bit position means for storing a function of the write pass count comprises one bit position in each storage location of the array.

4. The system of claim 3 wherein said array is addressable by an address of n bits, said counters each comprise n bit positions designated 1 through n for the address and a bit position n+1 for said pass count.

5. The buffer system of claim 4 wherein data entering the buffer system has a parity bit and data leaving the buffer system has a parity bit, and wherein said write circuits include means for forming a parity bit for data to be stored in a storage location,
 wherein the improvement comprises,
 means in said write circuits for forming said function of the write pass count as the parity function of said date parity and the n+1th bit of the write address counter, and
 means in said read circuits for forming a parity bit for data leaving the array as a function of the parity of a word read from the array (including the data part and the parity bit in said one bit position) and the n+1th bit of the read address counter,
 whereby a fault in said write circuits or said read circuits causes a mismatch between the write pass counter and the read.pass counter and the mismatch causes a parity error in said data leaving the buffer system.

6. The buffer system of claim 5 including means for setting said read counter according to the value of the write address counter at the beginning of an operation, whereby the said address sequence is continued from one data transfer operation to the next without reset to a fixed starting value and consecutive passes through the array have different count values in the read and write counters.

* * * * *